(12) United States Patent
Fujita et al.

(10) Patent No.: US 6,862,937 B2
(45) Date of Patent: Mar. 8, 2005

(54) LOAD SENSOR, TEMPERATURE COMPENSATION METHOD FOR THE LOAD SENSOR AND MANUFACTURING METHOD OF THE LOAD SENSOR

(75) Inventors: Kaori Fujita, Kariya (JP); Toshiharu Mikami, Toyohashi (JP); Kiyotaka Kinoshita, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 38 days.

(21) Appl. No.: 10/347,460

(22) Filed: Jan. 21, 2003

(65) Prior Publication Data
US 2003/0164047 A1 Sep. 4, 2003

(30) Foreign Application Priority Data
Jan. 18, 2002 (JP) ........................................ 2002-009469

(51) Int. Cl.⁷ ............................................... G01B 7/16
(52) U.S. Cl. ............................................... 73/766
(58) Field of Search .................................. 73/765, 766

(56) References Cited

U.S. PATENT DOCUMENTS

| | | | |
|---|---|---|---|
| 3,748,623 A | | 7/1973 | Millar |
| 4,628,296 A | | 12/1986 | Kitagawa et al. |
| 5,024,101 A | * | 6/1991 | Tanaka et al. ................. 73/766 |
| 5,048,343 A | * | 9/1991 | Oboodi et al. ................. 73/766 |
| 5,419,199 A | * | 5/1995 | Araki ........................... 73/708 |
| 6,058,783 A | * | 5/2000 | Berthold et al. .............. 73/766 |
| 6,301,775 B1 | * | 10/2001 | Piazza ........................ 29/621.1 |

FOREIGN PATENT DOCUMENTS

JP 05-118932 5/1993

* cited by examiner

*Primary Examiner*—Max Noori
(74) *Attorney, Agent, or Firm*—Oblon, Spivak, McClelland, Maier & Neustadt, P.C.

(57) ABSTRACT

A load sensor comprises a load detecting element and a temperature compensating element. The load detecting element is made of the material and acting the load thereon. The temperature compensating element is made of the same material with the load detecting element, and made as the same dimension or similar figure with the load detecting element. The load detecting element and the temperature compensating element are arranged closely each other. Further, each of the load detecting element and the temperature compensating element comprises conductive part which is made of the same composite. The conductive parts of the load detecting element and the temperature compensating element are electrically connected to a power source in parallel each other. Difference between voltages which act on the conductive parts of the load detecting element and the temperature compensating element is detected as a equivalent of the load.

18 Claims, 9 Drawing Sheets

LOAD SENSOR, TEMPERATURE COMPENSATION METHOD FOR THE LOAD SENSOR AND MANUFACTURING METHOD OF THE LOAD SENSOR

INCORPORATION BY REFERENCE

The present application claims priority under 35 U.S.C. §119 to Japanese Patent Application No. 2002-9469, filed on Jan. 18, 2002. The contents of that application are incorporated herein by reference in their entirety.

BACKGROUND OF THE INVENTION

1. Field of the Invention

This invention relates to a load sensor using a material which ohmic resistance changes according to load acting thereon, a temperature compensation method for the load sensor and a manufacturing method of the load sensor.

2. Discussion of the Background

Semiconductors such as silicon or functional ceramics are known as materials whose ohmic resistance changes according to load acting thereon. The ohmic resistance of these materials changes according to not only the load but also temperature. Therefore, some temperature compensation is needed in order to use these materials for a detecting element of a load sensor. On that account, a first conventional load sensor adopts a load detecting element which the ohmic resistance changes more greatly according to the load than according to the temperature. A second conventional load sensor has a temperature sensor such as thermistor and a compensation circuit which compensates output from the detecting element according to the temperature measured by the temperature sensor. A third conventional load sensor has a compensation element which has similar temperature characteristic with a load detecting element, and compensates output from the detecting element by the compensation element. Japanese Laid Open Patent Publication No. 5-118932 discloses one example of the third conventional load sensor. The load sensor disclosed by the publication uses amorphous-magnetism-alloy for a load detecting element. The amorphous-magnetism-alloy is coiled around one part which load acts on and another part which load does not act on respectively. Variation of magnetic permeability of each amorphous-magnetism-alloy is detected by a coil. And so, a temperature characteristic of the magnetic permeability of the amorphous-magnetism-alloy is compensated by difference of the magnetic permeability of both amorphous-magnetism-alloy.

However, in the first conventional load sensor, it is difficult to get such small temperature characteristic material for the detecting element. Even if it can be gotten, since the temperature characteristic of the material is even small but not zero, some detection error of the load sensor causes in a circumstance of huge temperature variation. In the second conventional load sensor, if the temperature characteristic of the material is a linear function, the compensation circuit can compensate the output from the detecting element. However, when the temperature characteristic of the material is a non-linear function, the compensation circuit can not compensate the output correctly. In the third conventional load sensor, it is difficult to get such similar temperature characteristic element for the compensation element. Even if it can be gotten, there is a problem that temperature difference between the load detecting element and the compensation element causes because of difference of installation locations or forms of the load detecting element and the compensation element.

SUMMARY OF THE INVENTION

In view of the foregoing, it is an object of the present invention to provide an improved load sensor, a temperature compensation method for the load sensor and a manufacturing method of the load sensor.

In order to achieve the above and other objects, a first aspect of the present invention provides a load sensor using a material which ohmic resistance changes according to load acting thereon. The load sensor comprises a load detecting element and a temperature compensating element. The load detecting element is made of the material and acting the load thereon. The temperature compensating element is made of the same material with the load detecting element, and made as the same dimension or similar figure with the load detecting element. The load detecting element and the temperature compensating element are arranged closely each other.

A second aspect of the present invention provides a temperature compensating method for the load sensor. The temperature compensating method comprises steps as follows. Arranging the load detecting element and the temperature compensating element closely. Connecting the conductive parts of the load detecting element and the temperature compensating element to a power source electrically in parallel each other. Making the load act on the load detecting element. And, detecting difference between voltages which act on the conductive parts of the load detecting element and the temperature compensating element as an equivalent of compensated load.

A third aspect of the present invention provides a manufacturing method for the load sensor. The manufacturing method comprises steps as follows. Producing an element which comprises the material as a conductive part. Cutting the element into the same dimensional pieces. Arranging a couple of pieces of the element closely. Then, one piece of the element functions as a load detecting element which the load acts thereon and another piece of the element functions as a temperature compensating element. And, connecting the conductive parts of the load detecting element and the temperature compensating element to a power source electrically in parallel each other.

A fourth aspect of the present invention provides another manufacturing method for the load sensor. The manufacturing method comprises steps as follows. Producing an element which comprises the material as a conductive part. Forming the groove in the center of the element so that the conductive part of the element is divided into a couple of the same dimensional parts. Then, one part of the element functions as a load detecting element which the load acts thereon and another part of the element functions as a temperature compensating element. And, connecting the conductive parts of the load detecting element and the temperature compensating element to a power source electrically in parallel each other.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

First Embodiment

Figure 1:
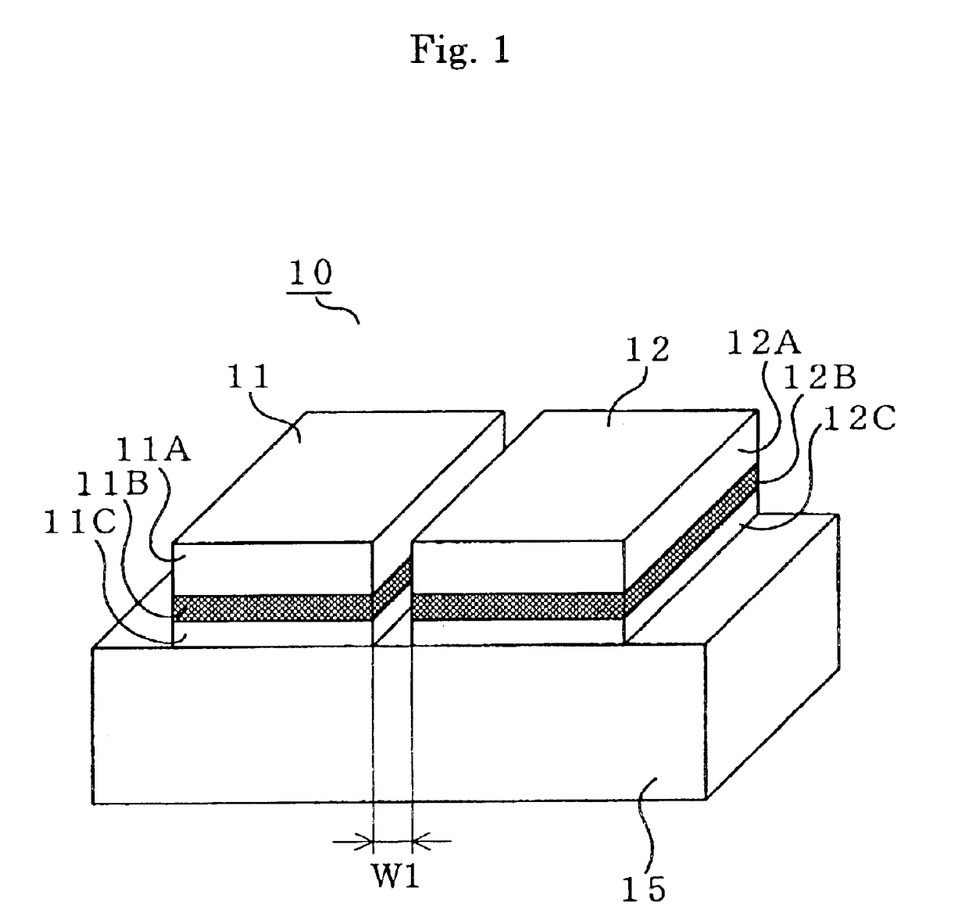
FIG. 1 is a perspective view of a load sensor according to a first embodiment of the present invention.
Figure 2:
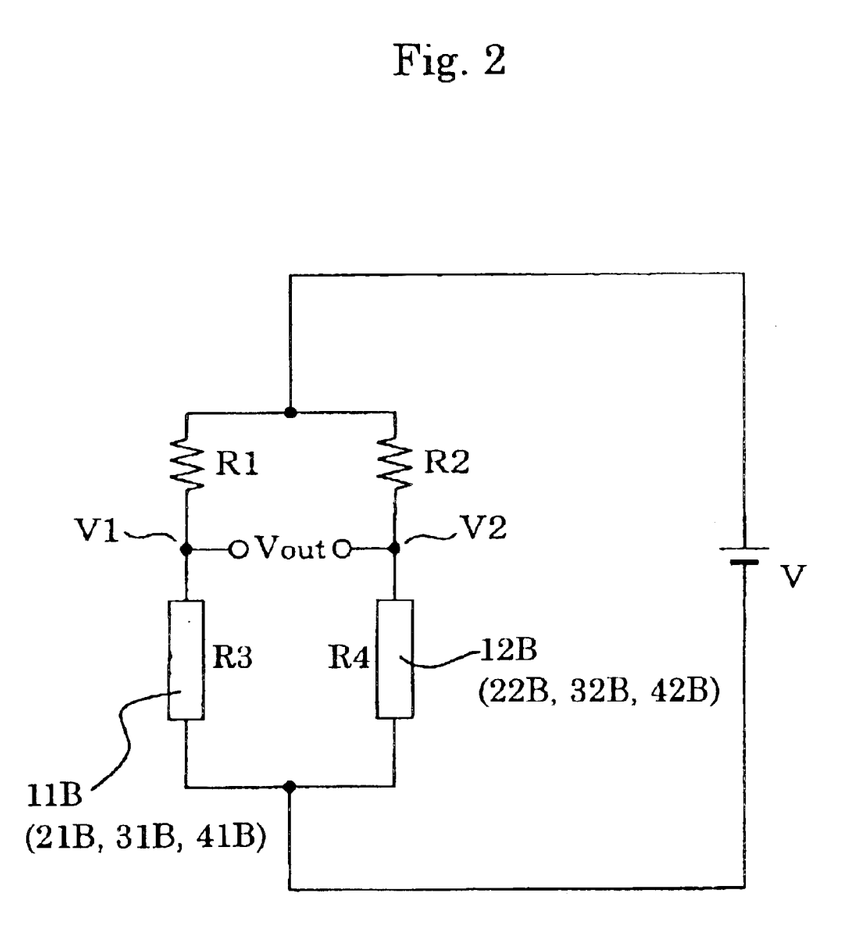
FIG. 2 is a circuit diagram of a load detecting circuit for the load sensor of the first embodiment.
Figure 3A:
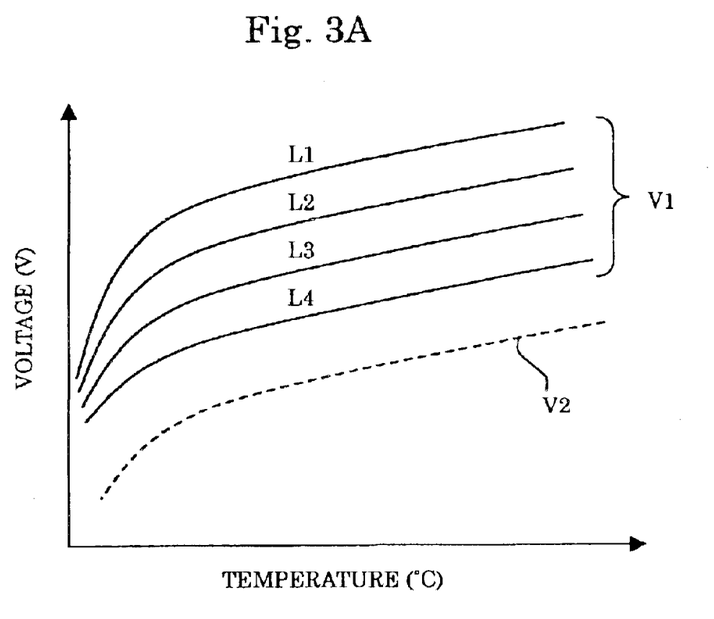
FIG. 3A is a graph showing relationships between temperature and voltages which act on a load detecting element and a temperature compensating element of the load sensor of the first embodiment.
Figure 3B:
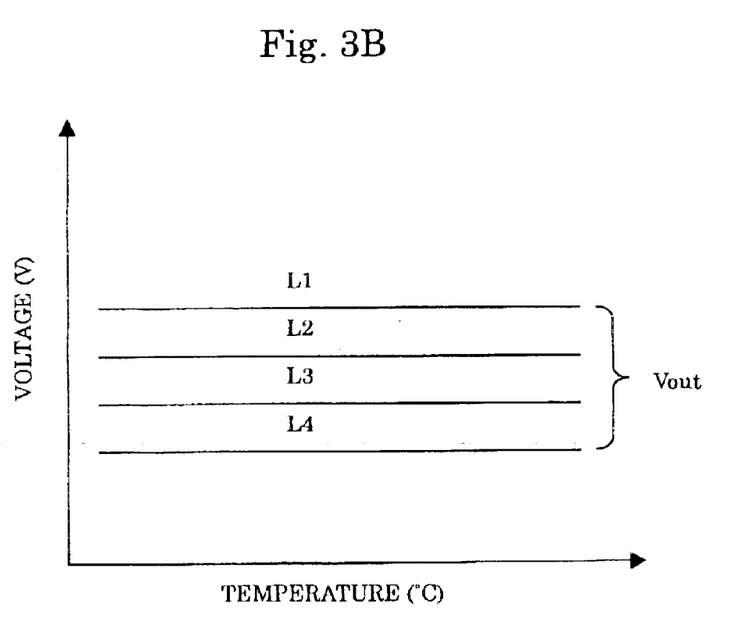
FIG. 3B is a graph showing relationships between temperature and compensated voltage of the load sensor of the first embodiment.

FIG. 1 shows a load sensor 10 according to the first embodiment of the present invention. The load sensor 10 comprises a pedestal 15, a load detection element 11 and a temperature compensating element 12, wherein these elements are stuck on the pedestal 15 side by side. The pedestal 15 is made of metal such as titanium. The load detecting element 11 and the temperature compensating element 12 are made of ceramics and are the same structure and the same dimension each other. Load that is measured acts on only the load detecting element 11 in the vertical direction. Distance W1 between the load detecting element 11 and the temperature compensating element 12 is preferable to be shorter than 1 mm, and is 0.8 mm in this embodiment. The load detection element 11 and the temperature compensating element 12 have a sandwich structure which a conductive part 11B, 12B located in middle is caught between insulations of top and bottom 11A, 11C, 12A, 12C. The insulations 11A, 11C, 12A, 12C are made of silicon nitride ($Si_3N_4$) which includes a little sintering additive. The conductive parts 11B, 12B are made of silicon nitride ($Si_3N_4$) which includes silicon carbide (SiC) of from 10 weight % to 40 weight % in order to have conductivity properties. Elements for the load detection element 11 and the temperature compensating element 12 are produced by hot press so that base materials for the insulations 11A, 11C, 12A, 12C and the conductive parts 11B, 12B sandwiched therebetween are compressed by pressure of dozens MPa in the vertical direction, sintered, and made as unified ceramics. Using the hot press brings high gage factor to the element. The element made as above is cut to cubes of one side of 5 mm and stuck on the pedestal 15 in order to be the load detection element 11 and the temperature compensating element 12. A metal as electrodes (not shown) are evaporated on front side and back side of the load detection element 11 and the temperature compensating element 12 respectively in order to detect ohmic resistance of the conductive parts 11B, 12B. As shown by FIG. 2, the load detection element 11 and the temperature detection element 12 are connected in serial to resistances R1, R2 respectively, and connected in parallel to a rating power V in order to constitute an load detecting circuit. Now, ohmic values of the resistances R1, R2 are equal. The load is detected so as to measure voltage difference Vout between a voltage V1 acting on the conductive part 11B of the load detecting element 11 and a voltage V2 acting on the conductive part 12B of the temperature compensating element 12. The voltage V1 acting on the conductive part 11B is an equivalent of the load acting on the load detecting element 11, however this equivalent is not compensated by temperature. On the other hand, the voltage difference Vout is an equivalent of the load acting on the load detecting element 11 compensated by temperature. FIG. 3A shows a relationship between temperature and voltage acting on each of the conductive parts 11B, 12B, and FIG. 3B shows a relationship between temperature and compensated voltage Vout. When different values of loads L1–L4 act on the load detecting element 11, voltage V1 changes not only according to the value of the load but also according to the temperature as non-linear function. On the other hand, voltage V2 does not change according to the load but changes according to the temperature. However, according to the load detecting circuit shown by FIG. 2, voltage Vout, which is compensated output, is constant being independent of the temperature variation as shown by FIG. 3B. That is, when resistance of the conductive part 11B is expressed by R3, and resistance of the conductive part 12B is expressed by R4;

$V1=R3*V/(R1+R3)$ $V2=R4*V/(R2+R3)$ $Vout=V1-V2=[R3/(R1+R2)-R4/(R2+R4)]*V$ now, temperature is expressed by T, and reference resistance is expressed by R;

$R1=R2$ $R3=R4=(1+\alpha t)*R$ $Vout=[(1+\alpha t)*R/(R1+(1+\alpha t)*R)-(1+\alpha t)*R/R1+(1+\alpha t)*]*V=0$ therefore, the compensated output Vout does not have any temperature characteristics.

According to the aforementioned first embodiment, since the load detecting element 11 and the temperature compensating element 12 are made of the same materials, these have approximately the same temperature-resistance characteristic. Further, since the load detecting element 11 and the temperature compensating element 12 are located very close each other, these become approximately the same temperature. Furthermore, since dimensions of the load detecting element 11 and the temperature compensating element 12 are the same, temperatures of both elements 11, 12 change simultaneously because these have the same thermal capacity. Therefore, temperature characteristic of the load sensor 10 is certainly compensated, and the load sensor 10 can detect load precisely.

Second Embodiment

Figure 4:
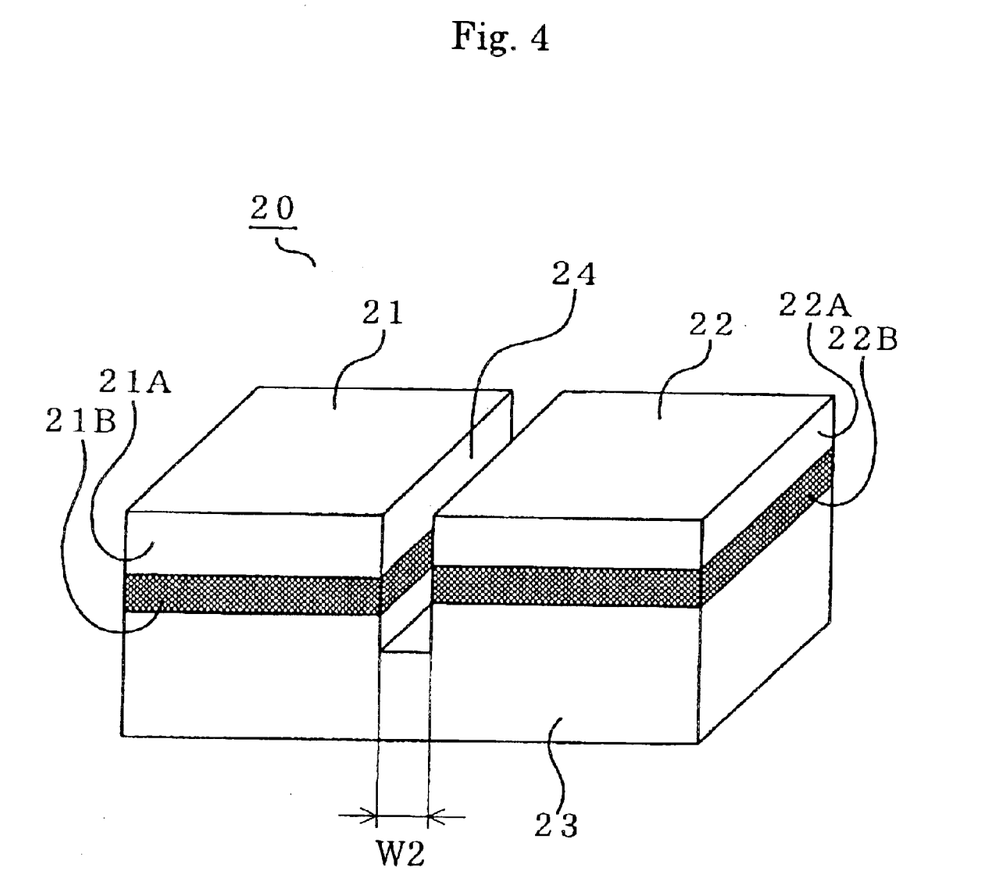
FIG. 4 is a perspective view of a load sensor according to a second embodiment of the present invention.

FIG. 4 shows a load sensor 20 according to the second embodiment of the present invention. In the second embodiment, the metal pedestal 15 of the first embodiment is omitted, and an insulation 23 also functions as a common pedestal. Although an element of the load sensor 20 is made by hot press as the same way with the first embodiment, initially an insulation 21A&22A and a conductive part 21B&22B are single piece of material respectively. Materials for the couple piece of insulations 21A&22A, 23 and the conductive part 21B&22B sandwiched therebetween are compressed by pressure of dozens MPa in the vertical direction, sintered and made as unified ceramics. The element made as above is cut into a rectangular solid of 5 mm length, 10 mm width and 1.5 mm height. Compositions of the insulations 21A&22A, 23 and the conductive part 21B&22B are the same with the first embodiment respectively. A groove 24 reaching into the lower insulation 23 is formed in the center of the rectangular solid element by a diamond cutter in order to divide the insulation 21B&22B. The width W2 of the groove 24 is preferable to be shorter than 1 mm, and it is 0.2 mm in this embodiment. One of the divided insulation 21B functions as the load detecting element 11, and another of the insulation 22B functions as the temperature compensating element 12. A load detecting circuit for the load sensor 20 of the second embodiment is the same with the circuit of the first embodiment shown by FIG. 2.

According to the aforementioned second embodiment, since the load detecting element 21 and the temperature compensating element 22 are made so as to form the groove 24 into the single piece of the unified ceramics, the load detecting element 21 and the temperature detection element 22 can be located very closely. As a result, temperature difference between the load detecting element 21 and the temperature detection element 22 become approximately zero, and so capability for temperature compensation is improved. In addition, according to the aforementioned manufacturing method, variation of quality of the load detecting element 21 and the temperature compensating element 22 is significantly reduced. That is, difference of the temperature-resistance characteristic between the load detecting element 21 and the temperature compensating element 22 become approximately zero, and so capability for temperature compensation is further improved. Furthermore, according to the aforementioned manufacturing method, manufacturing cost can be reduced.

Third Embodiment

Figure 5:
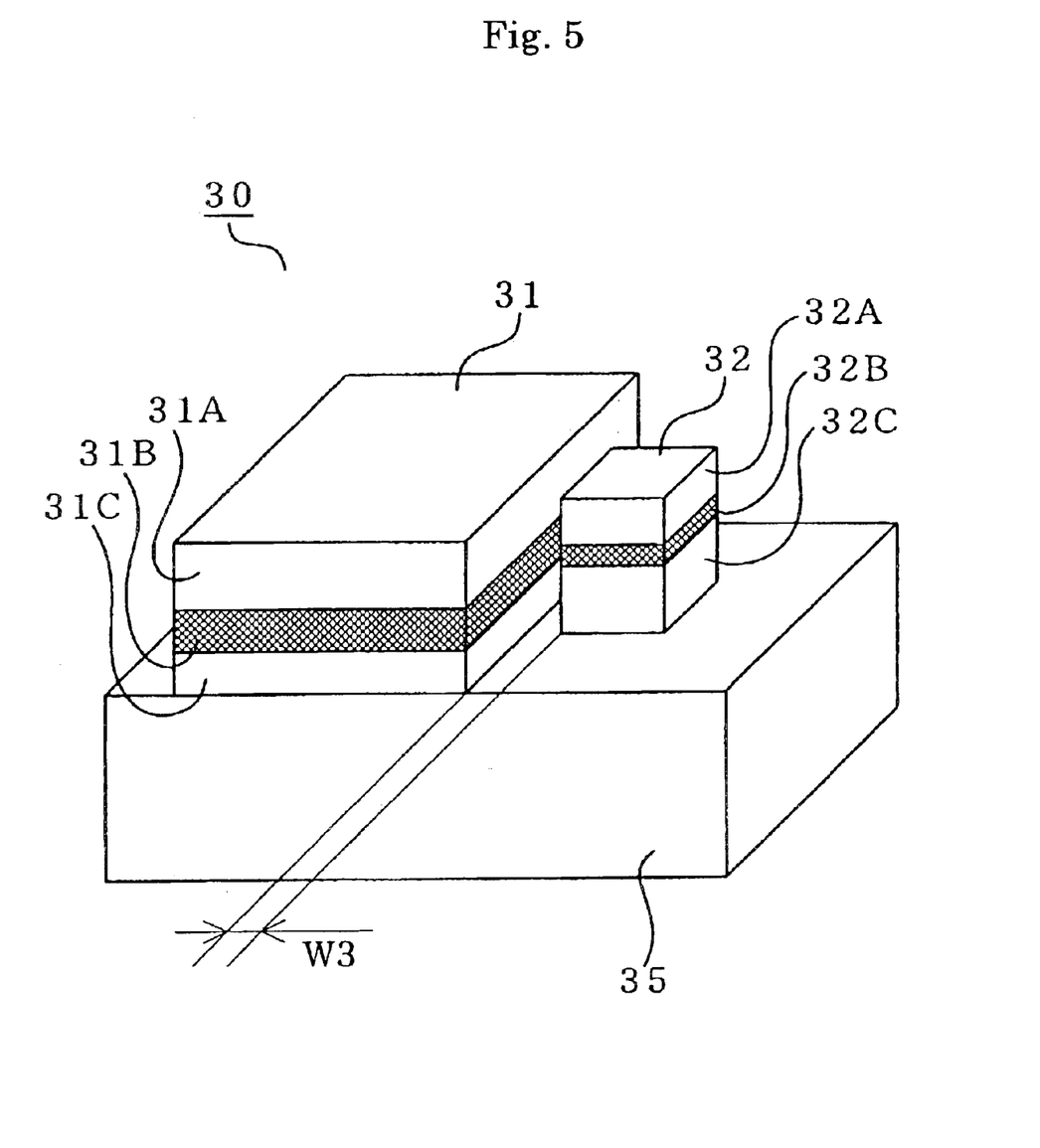
FIG. 5 is a perspective view of a load sensor according to a third embodiment of the present invention.

FIG. 5 shows a load sensor 30 according to the third embodiment of the present invention. In the third embodiment, a load detecting element 31 which is made as the same way with the first embodiment and a temperature detection element 32 which is made as the same way with the first embodiment but is smaller than the load detection element 31 are stuck on a pedestal 35. As the same with the first embodiment, the load detecting element 31 consists of insulations 31A, 31B and a conductive part 31B sandwiched therebetween, and the temperature compensating element 32 is consists of insulations 32A, 32C and a conductive part 32B sandwiched therebetween. Compositions of the insulations 31A, 31C and the conductive part 31B, 32B are the same with the first embodiment respectively. Distance W3 between the load detecting element 31 and the temperature compensating element 22 is preferable to be shorter than 1 mm, and is 0.8 mm in this embodiment. A load detecting circuit for the load sensor 30 of the third embodiment is the same with the circuit of the first embodiment shown by FIG. 2.

Although the temperature compensating element 32 is small, it is similar figure with the load detection element 31. Since the insulations 31B, 32B are made of the same material and have the same specific resistance ($\Omega$ cm), these have approximately the same temperature-resistance characteristic. Therefore, even if the temperature compensating element is small temperature characteristic of the load sensor 30 is certainly compensated. It is preferable that dimensions of the load detecting element and the temperature compensating element are the same like the first and the second embodiments in a viewpoint that temperatures of the both elements change simultaneously. However, in a circumstance that there is a heat gradient, it is preferable that the temperature compensating element 32 is small because the small temperature compensating element responds temperature variation quickly. For instance, in a case that a heat source is in the left side, the load sensor 30 is installed so that the load detecting element 31 is in the left side and the temperature compensating element 32 is in the right side. Although the temperature compensating element 32 is far from the heat source, temperature of the temperature compensating element 32 responds quickly because thermal capacity of the temperature compensating element 32 is small. According to the aforementioned third embodiment, compact load sensor and low cost load sensor can be provided in comparison with the first embodiment in addition to above described advantages.

Fourth Embodiment

Figure 6:
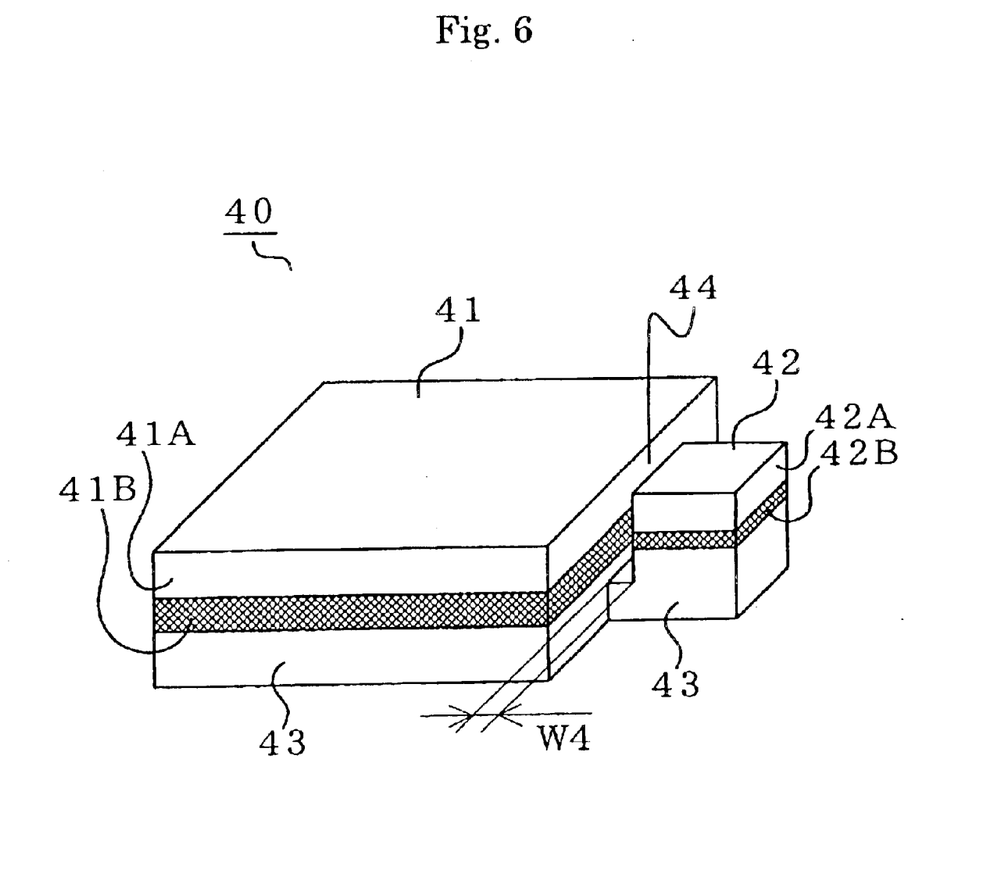
FIG. 6 is a perspective view of a load sensor according to a fourth embodiment of the present invention.

FIG. 6 shows a load sensor 40 according to the fourth embodiment of the present invention. The load sensor 40 of the fourth embodiment is equivalent with the load sensor 30 of the third embodiment. However, the pedestal 35 of the third embodiment is omitted like the load sensor 20 of the second embodiment, and an insulation 43 also functions as a common pedestal. An element of the load sensor 40 is made by hot press as follows. Base material for an insulation 43 is put into a common drag, and a partition board is put on the insulation 43. Materials for a conductive part 41B and an insulation 41A are put into the left side separated by the partition board, and material for a conductive part 42B and an insulation 42A are put into the right side separated by the partition board. Quantities of these materials are decided so that the load detecting element 41 and the temperature compensating element 42 become similar figures. These are compressed by each cope which has pressure of dozens MPa in the vertical direction, sintered, and made as unified ceramics. Compositions of the insulations 41A, 42A, 43 and the conductive part 41B, 42B are the same with the first embodiment respectively. After the partition board is removed, a groove 44 is formed along a cavity made by the partition board by a diamond cutter. The width W4 of the groove 44 is preferable to be shorter than 1 mm, and it is 0.2 mm in this embodiment. One of the conductive part 41B functions as the load detecting element 41, and another of the conductive part 42B functions as the temperature compensating element 42. A load detecting circuit for the load sensor 40 of the fourth embodiment is the same with the circuit of the first embodiment shown by FIG. 2.

According to the aforementioned fourth embodiment, above described advantages according to both of the second embodiment and the third embodiment can be achieved.

Fifth Embodiment

Figure 7:
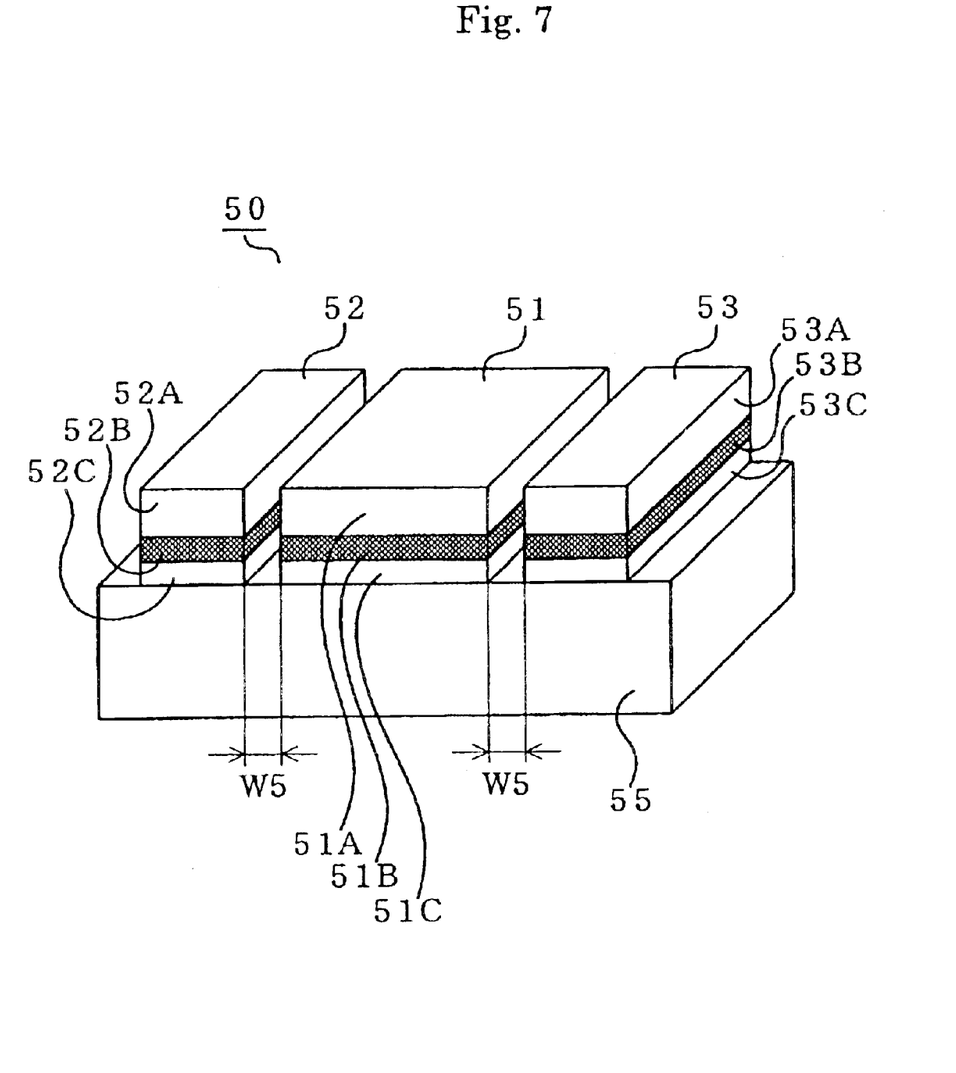
FIG. 7 is a perspective view of a load sensor according to a fifth embodiment of the present invention.
Figure 8:
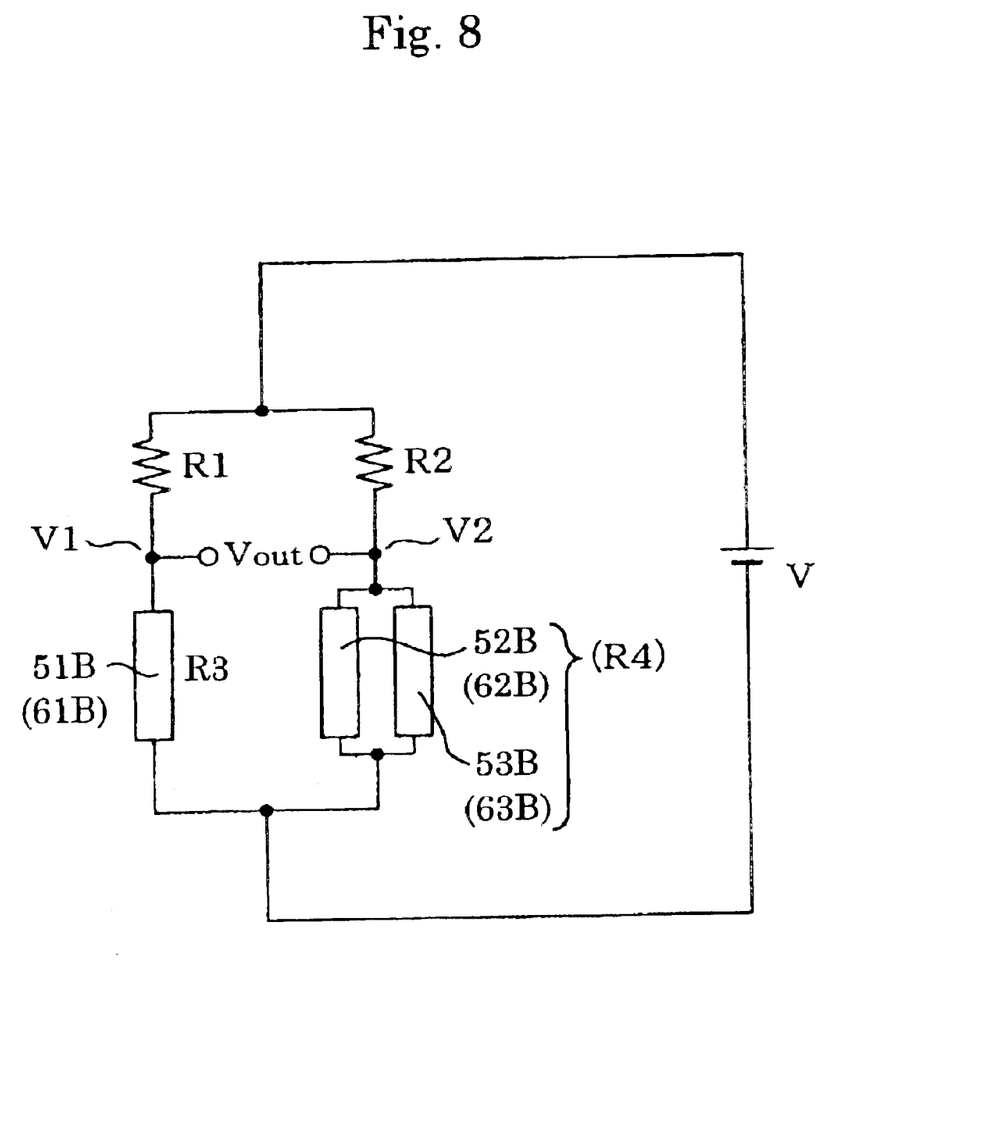
FIG. 8 is a circuit diagram of a load detecting circuit for the load sensor of the fifth embodiment.

FIG. 7 shows a load sensor 50 according to the fifth embodiment of the present invention. In the fifth embodiment, a load detecting element 51 which is made as the same way with the first embodiment and a temperature detection element 52, 53 which is made as the same way with the first embodiment, but is divided two parts are stuck on a pedestal 55. The load detection element 51 which is 5 mm length and 5 mm width is placed at the center of the pedestal 55. The temperature compensating elements 52, 53 which are 5 mm length and 2.5 mm width respectively are placed at both sides of the load detecting element 52. Distances W5 between the load detecting element 51 and the temperature compensating elements 52, 53 are preferable to be shorter than 1 mm, and are 0.8 mm in this embodiment. As the same with the first embodiment, the load detecting element 51 consists of insulations 51A, 51C and a conductive part 51B sandwiched therebetween, and the temperature compensating elements 52, 53 are consists of insulations 52A, 52C, 53A, 53C and conductive parts 52B, 53B sandwiched therebetween respectively. Compositions of the insulations 52A, 52C, 53A, 53C and the conductive parts 52B, 52B are the same with the first embodiment respectively. As shown by FIG. 8, a load detecting circuit for the load sensor 50 of the fifth embodiment is the same with the circuit of the first embodiment except that a couple of conductive parts 52B, 53B are connected in parallel. The conductive part 51B of the load detecting element 51 constitute a resistance R3 which is connected to a rating power V via a resistance R1. The conductive parts 52B, 53B of the temperature compensating elements 52, 53 connected in parallel constitute a combined resistance R4 which is connected to the rating power V via a resistance R2. Voltage difference V1–V2 between voltage V1 acting on the conductive part 51B and voltage V2 acting on the conductive parts 52B, 53B is output signal Vout of the load detecting circuit as an equivalent of the load acting on the load detecting element 51 which is compensated by temperature.

According to the aforementioned fifth embodiment, the output from the load detecting element 51 is compensated by an average of outputs from the left temperature compensating element 52 and the right temperature compensating element 53. Therefore, in a circumstance that there is a heat gradient, temperature characteristic of the load sensor 50 is certainly compensated, and the load sensor 50 can detect load precisely.

Sixth Embodiment

Figure 9:
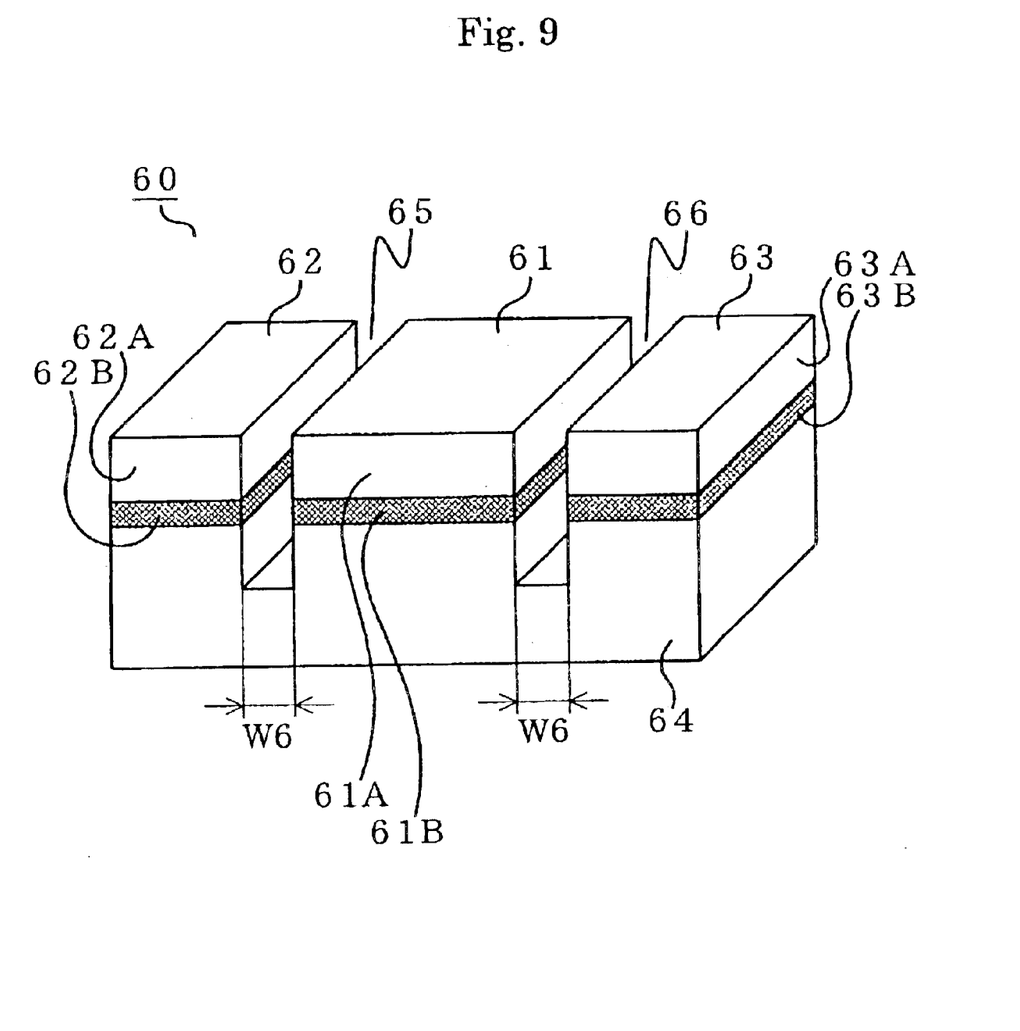
FIG. 9 is a perspective view of a load sensor according to a sixth embodiment of the present invention.

FIG. 9 shows a load sensor 60 according to the sixth embodiment of the present invention. In the sixth embodiment, the metal pedestal 55 of the fifth embodiment is omitted, and a insulation part 64 also functions as a common pedestal like the second embodiment. Although an element of the load sensor 60 is made by hot press as the same way with the fifth embodiment, initially an insulation 61A&62A&63A and a conductive part 61B&62B&63B are single piece of material respectively. The couple piece of insulations 61A&62A&63A, 64 and the conductive part 61B&62B&63B sandwiched therebetween are compressed by pressure of dozens MPa in the vertical direction, sintered, and made as unified ceramics. The element made as above described is cut to a rectangular solid of 5 mm length, 10 mm width and 1.5 mm height. Compositions of the insulations 61A&62A&63A, 64 and the conductive part 61B&62B&63B are the same with the first embodiment respectively. A couple of grooves 65, 66 reaching into the lower insulation 64 is formed in the rectangular solid by a diamond cutter in order to divide the insulation 61B&62B&63B. The widths W6 of the grooves 65, 66 are preferable to be shorter than 1 mm, and these are 0.2 mm in this embodiment. One of the divided insulation 61B located in the center functions as the load detecting element 61, and other of the insulations 62B, 63B function as the temperature compensating elements 62, 63 respectively. A load detecting circuit for the load sensor 60 of the sixth embodiment is the same with the circuit of the fifth embodiment shown by FIG. 8.

According to the aforementioned sixth embodiment, above described advantages according to both of the second embodiment and the fifth embodiment can be achieved.

Obviously, numerous modifications and variations of the present invention are possible in light of the above teachings. It is thereby to be understood that within the scope of the appended claims, the present invention may be practiced otherwise than as specifically described herein.

What is claimed is:

1. A load sensor using a material whose ohmic resistance changes according to load acting thereon, comprising:
    a load detecting element subjected to a load and made of the material; and
    a temperature compensating element made of the same material as the load detecting element and not subjected to a load, said temperature compensating element having substantially the same shape, and dimensions which are not greater than, the load detecting element; wherein
    the load detecting element and the temperature compensating element are arranged closely to each other.

2. A load sensor according to claim 1, wherein each of the load detecting element and the temperature compensating element comprises a conductive part which is made of a composite.

3. A load sensor according to claim 2, wherein:
    the conductive parts of the load detecting element and the temperature compensating element are electrically connected to a power source in parallel with each other; and
    a difference between voltages which act on the conductive parts of the load detecting element and the temperature compensating element is detected as an equivalent of the load.

4. A load sensor according to claim 1, wherein a distance between the load detecting element and the temperature compensating element is shorter than 1 mm.

5. A load sensor according to claim 4, wherein each of the load detecting element and the temperature compensating element comprises two insulations having a conductive part sandwiched therebetween.

6. A load sensor according to claim 5 further comprising a pedestal on which the load detecting element and the temperature compensating element are arranged.

7. A load sensor according to claim 5, wherein one of the insulations of each of the load detecting element and the temperature compensating element functions as a common pedestal.

8. A load sensor according to claim 1, wherein the material whose ohmic resistance changes according to the load acting thereon is ceramics.

9. A load sensor according to claim 8, wherein the ceramics is a sintered ceramics whose ceramics ingredient as a base material is sintered.

10. A load sensor according to claim 9, wherein the ceramics ingredient comprises silicon nitride ($Si_3N_4$) and silicon carbide (SiC).

11. A load sensor according to claim 1, wherein the temperature compensating element is divided into plural pieces and closely arranged around the load detecting element.

12. A load sensor according to claim 1, wherein the load detecting element and the temperature compensating element are made by cutting a single piece of element.

13. A load sensor according to claim 1, wherein the load detecting element and the temperature compensating element are made by forming a groove into the center of a single piece element.

14. A load sensor according to claim 1, wherein two of the temperature compensating elements are arranged on both sides of the load detecting element.

15. A load sensor according to claim 14, wherein a dimension of each temperature compensating element is half of the dimension of the load detecting element.

16. A temperature compensating method for a load sensor using a material whose ohmic resistance changes according to load acting thereon, comprising:

arranging a load detecting element and a temperature compensation element closely, wherein the load detecting element and the temperature detecting element are made of the same material, have substantially the same dimensions, and respectively comprise conductive parts;

connecting the conductive parts of the load detecting element and the temperature compensating element to a power source electrically in parallel with each other, making a load act only on the load detecting element and not on the temperature compensating element; and detecting a difference between voltages which act on the conductive parts of the load detecting element and the temperature compensating element as an equivalent of a compensated load.

17. A load sensor according to claim 1, wherein the load detecting element and the temperature compensating element have substantially the same dimensions.

18. A load sensor according to claim 1, wherein a dimensions of the temperature compensating element is smaller than that of the load detecting element.

* * * * *